United States Patent [19]

Rahmes

[11] Patent Number: 5,159,851
[45] Date of Patent: Nov. 3, 1992

[54] BICYCLE GRIP

[76] Inventor: Paul Rahmes, 245 W. Marquita, Suite H, San Clemente, Calif. 92672

[21] Appl. No.: 762,545

[22] Filed: Sep. 18, 1991

[51] Int. Cl.⁵ .................................................. B62K 21/26
[52] U.S. Cl. ..................................... 74/551.9; D8/303; 74/558.5
[58] Field of Search ................. 74/551.9, 551.1, 558.5; D8/303

[56] References Cited

U.S. PATENT DOCUMENTS

| D. 319,770 | 9/1991 | Borromeo | D8/303 |
| 4,459,871 | 7/1984 | Shimano | 74/551.9 X |
| 4,548,092 | 10/1985 | Strong, Jr. | 74/551.9 X |

FOREIGN PATENT DOCUMENTS

| 688541 | 2/1940 | Fed. Rep. of Germany | 74/551.9 |
| 1112170 | 3/1956 | France | 74/551.9 |
| 2326324 | 6/1977 | France | 74/551.9 |
| 2366165 | 6/1978 | France | 74/551.9 |
| 362600 | 8/1938 | Italy | 74/551.9 |

Primary Examiner—Rodney H. Bonck
Assistant Examiner—Andrea Pitts

[57] ABSTRACT

Disclosed is a brake grip 10 including a body member 12 and a lever arm section 14. The brake grip 10 has an ergonomically shaped exterior surface which supports and distributes proportionately the weight and pressure experienced by a hand grasping the grip during bicycling. The body member 12 includes a palm saddle 20, a rocker ridge 32 along an outer rear edge of the palm saddle, and a thumb ledge 22 on an inner side of the body member. An outwardly projecting wedge element 46 is at the front end of the palm saddle 20. The wedge element 46 terminates at an outer end in a semi-rounded tip 46a, and it has a base 46b which merges at a lower, inner side portion with the curved surface 30 of the thumb ledge 22, and at a lower, rear portion with a front end of the palm saddle 20. The merging portions form a smooth, rounded, enlarged load bearing surface. The lever arm section 14 has grooves 50-52 for fingers and it covers the exterior of a lever arm 48 of a conventional brake lever.

18 Claims, 5 Drawing Sheets

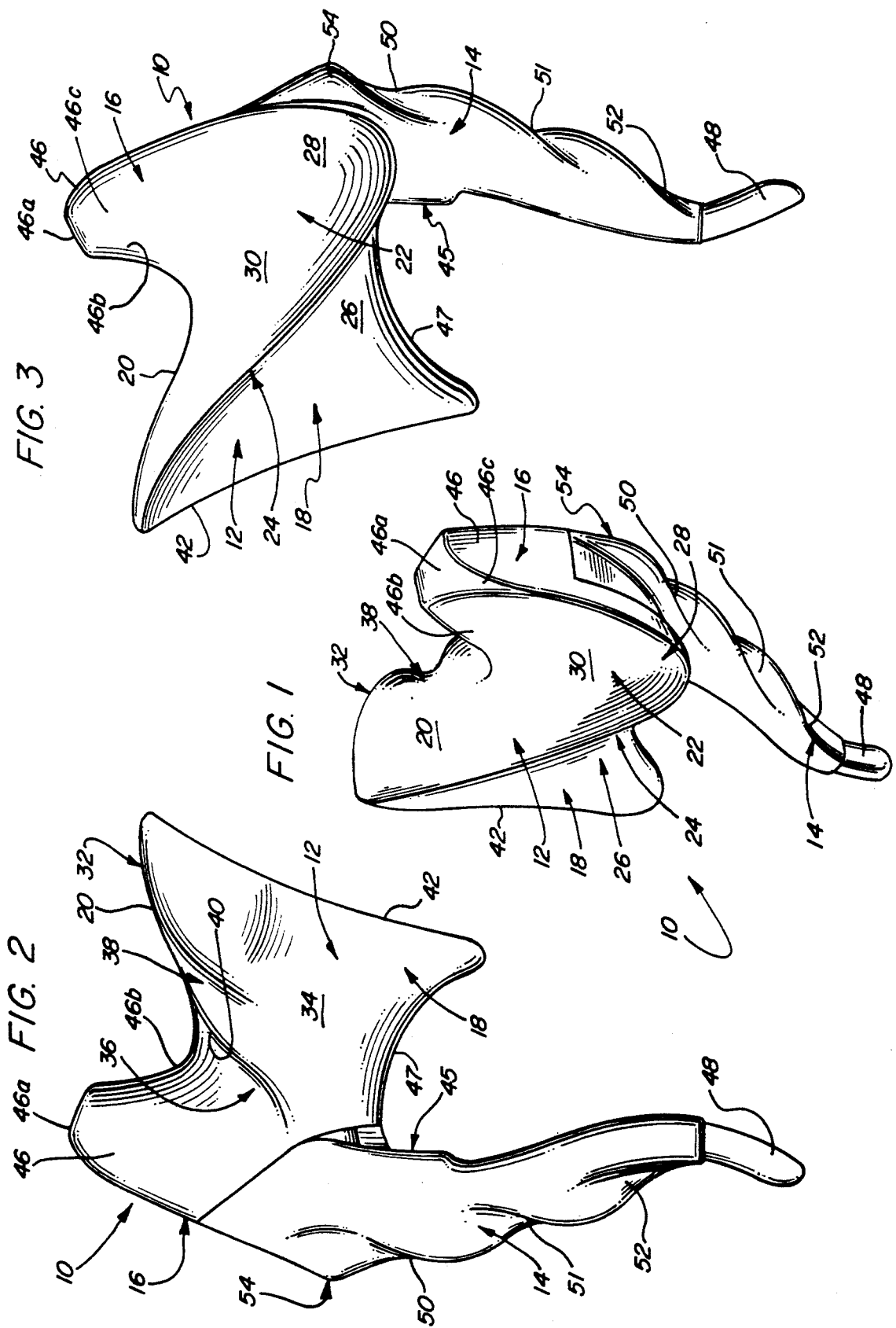

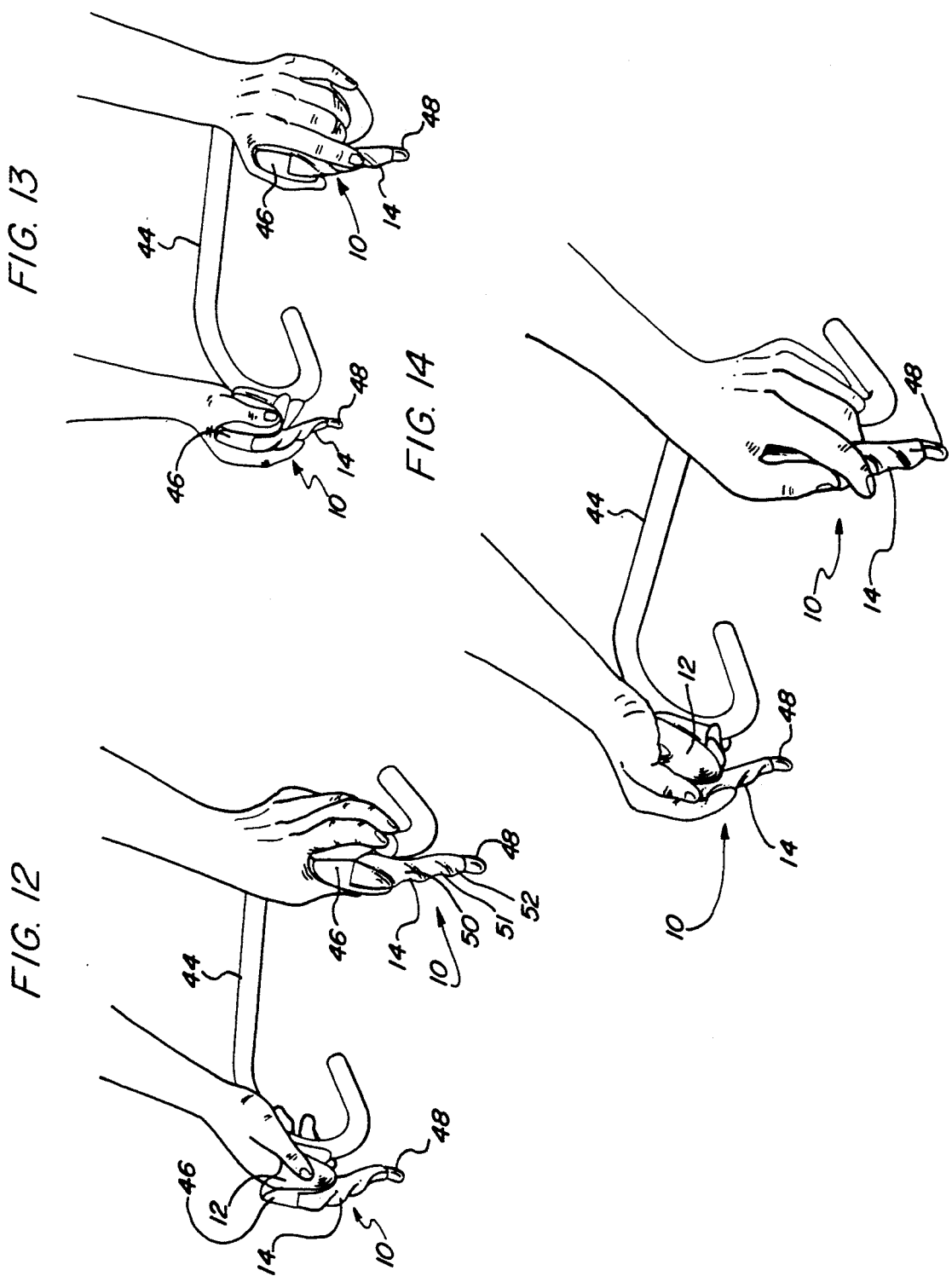

BICYCLE GRIP

BACKGROUND OF THE INVENTION

1. Field of the Invention

This invention relates to an ergonomically designed bicycle brake grip, particularly one used with 10-16 speed, recreational or racing-type bicycles, with "drop," aero or similar type handle bars and attached brake levers. It is not, however, limited to such use.

2. Background Discussion

Ten to sixteen speed bicycles used for recreational road riding, touring or racing usually employ "drop" or similar type handle bars with brake levers attached to the bars, either at the forward bends in the bars or elsewhere. The brake levers are comprised of a body member, a lever arm, and an internal spring mechanism. The body member is made of a hard material such as, for example, a metal, a rigid plastic, fiber glass, or a carbon fiber reinforced material. The lever arm is attached at one end to the body member by a hinge. The lever arm serves two main purposes: as a brake actuator and as a hand grip. The body member is secured to the handle bars and the lever arm is positioned to facilitate grasping with the fingers.

The brake levers are designed poorly with respect to the safety, performance, and comfort of the bicyclist, and fail to take into consideration the anatomy of the bicyclist's hand and how the bicyclist adopts different grips depending on road conditions and other factors. The design of such conventional brake levers disregards the overriding operational reality that the bicyclist frequently changes between at least seven different major hand positions as terrain, road conditions, and speed change, or when discomfort is experienced. These hand positions, which shall be illustrated subsequently, are designated as "standard," "power pace," "steady climb," "aero," "cruise," "power climb," and "open road." All hand positions require a firm grasping of the grips. Conventional brake levers do not facilitate a secure, safe, and comfortable hold. Moreover, they do not provide adequate leverage and support, failing to compensate for the amount of upper body weight transferred through the hands, which frequently results in the hands slipping on the brake levers. Also, the design of conventional brake levers results in accelerated fatigue of the hands, causing the bicyclist to more frequently shift hand positions even if this is undesirable from a performance, safety, or comfort standpoint.

In an attempt to alleviate these problems, the body members of conventional brake levers have been equipped with thin, rubber sheaths which cover the exterior portion of the body member. These sheaths are shaped to conform to the overall, basic configuration of the body member. Their exterior surface is not designed to compensate for the many different hand positions that the bicyclist may prefer. The sheaths are not adequately designed to provide the desired, and much needed, improvement in safety, performance, and comfort. Nor do they effectively eliminate hand slippage. They are too thin, and wear out quickly in heavily contacted areas. They fail to hold tightly to the hard surface of the brake levers, and severe slippage occurs between the body member and sheath. Such slippage frequently occurs during hill climbing or sprinting, when the bicyclist is off the seat of the bicycle, leaning forward and grasping the brake levers firmly. Slippage causes poor performance and can be very dangerous and fatiguing, resulting in undue stress on certain joints, ligaments, tendons, muscles, bones, soft tissue, and nerves in the hands. The sheaths also come in one size. This single sized sheath does not adequately support larger sized hands, leading to the problems of fatigue, slippage, and injury. Consequently, the bicyclist experiences difficulty in finding safe, comfortable, and non-slipping hand positions on the poorly designed conventional brake levers. The result is excessive and prolonged friction and pressure on the nerves, ligaments, tendons, bones, soft tissue, and muscles in the bicyclist's hands, leading to severe irritation, discomfort and ofttimes injury.

A related problem is the poor design of the lever arm, which has not been designed to take into consideration the safety, performance, comfort or anatomy This arm is not usually covered with any cushioning material, so that the bare hard surface directly contacts the bicyclist's fingers. Several of the hand positions require the bicyclist to use the lever arm in conjunction with the body member for support or leverage. The constant pressure exerted on the fingers causes extreme discomfort and irritation and can be damaging to the joints, ligaments, tendons, muscles, bones, soft tissue, and nerves of the fingers.

Typical hand grips are illustrated in the following U.S. Pat. Nos. 366,775; 3,436,090; 3,803,937; 3,868,110; and 4,771,649.

SUMMARY OF THE INVENTION

The present invention provides a bicycle brake grip having an ergonomical shape which distributes the force on the hands over an enlarged area to reduce the friction and pressure at sensitive contact points of the hands, fingers, and joints. The grip is preferably made of a cushioning material, such as rubber, but other material may be used. It may be in the form of a two piece sheath: one piece that can be stretched to fit over the body member of a conventional brake lever and the other piece stretched to fit over the lever arm of a conventional brake lever. Alternately, a brake lever body member may be molded from a suitable material such as plastic, or otherwise formed into the unique ergonomical shape of this invention. A lever arm is then molded, or otherwise formed, into the unique ergonomically shape of this invention and attached to the uniquely shaped body member in the conventional fashion.

The brake grip of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the structural features provide the advantages of this invention, which include safety, enhanced performance, and comfort.

The first feature of this invention is a palm saddle on the top surface of the body member. The palm saddle is oriented substantially horizontal when the bicycle is in an upright position. With the bicyclist leaning forward and grasping the brake grip, the palm saddle provides a relatively large surface area over which the weight of the bicyclist is distributed evenly and proportionately through the hands. Specifically, the palm saddle has a width of at least one and one-quarter inch and an area of at least three inches. Thus, the application of any excessive pressure applied directly to a localized point in the hand, joint, or finger is avoided. A portion of the grip corresponding substantially to the palm saddle may be replaceable when worn, damaged, or otherwise desired. The palm saddle is designed to reduce pressure on the ulnar and median nerves in the palm of the hand and to distribute the intense weight bearing pressure across the palm more evenly and proportionately than with conventional brake levers. It particularly reduces excessive stress on the opponens digiti minium, flexor brevis minimi digiti, and abductor digiti minimi muscles in the hand. In all the major hand positions, it also alleviates stress on the abductor pollicis, palmar interosseus, dorsal interosseus and lumbricals muscles, the hypothenar eminence muscles, and the soft tissue of the hand.

The second feature is a thumb ledge on the inner side of the body member. This thumb ledge terminates at an outer end in a thumb pad and expands rearward from the thumb pad as a smooth, concaved curved surface that has a wide rear end that merges with the palm saddle at an inside edge of the saddle. The palm saddle and thumb ledge combine to form an essentially hyperbolic parabolid shaped surface which is designed to relieve excess pressure on the ulnar nerve, the head of the proximal phalanx, the metocarpo phallangeal joint, the lateral ligament, and the soft tissue in the thumb. When the hands are in the "standard," "cruise," "power pace," and "power climb" positions, the thumb is essentially completely supported which also substantially eliminates the intense pressure ordinarily applied directly to the abductor pollicis, dorsal interosseus and first lumbrical muscle in these positions.

The third feature is a thumb pad which in combination with the thumb ledge provides, as a result of its breadth and curvalinear structure, added support for the thumb when the hand is in the "standard," "power climb," and "power pace" positions. It also aids in reducing pressure on the distal phalanx, the ulnar nerve, and the soft tissue of the thumb.

The fourth feature is an upwardly projecting wedge element in the body member which terminates at an outer end in a semi-rounded tip. Preferably, the semi-rounded tip has an inner angular face slopping downward at an angle of approximately 45°. The wedge element has a base which merges at its lower, inner side portion with the curved surface of the thumb ledge, and at a lower rear portion with a front end of the palm saddle. The merging portions form a smooth, rounded, enlarged load bearing surface. This wedge element has a height of at least ¾ inch, so that improved, non-slip gripping and leverage can be achieved. It preferably is from about ¾ to about 1¼ inch high, In all the major positions, except the cruise position, it relieves excess pressure on the ulnar nerves, the abductor pollicis and dorsal interosseus muscle between the thumb and index finger, and the first lumbrical muscles, and the soft tissue in the hand.

The fifth feature is a rocker ridge along an outer rear edge of the palm saddle. The rocker ridge is formed at the junction between an outer rear section of the outer side wall merging with the palm saddle to form an approximate right angle. In conjunction with the palm saddle, the rocker ridge provides much needed support for the hand in all the major hand positions. It relieves excess weight induced pressure on the opponens pollicis, abductor pollicis brevis and the flexor pollicis brevis muscles by providing an outwardly extending ledge or ridge which prevents the palm from slipping off, especially when in the "power climb" position. It also relieves pressure on the ulnar nerves, the hypothenar eminence muscles, and soft tissue of the palm.

The sixth feature is that the outer side wall of the body member has in it two biased grooves shaped and oriented to accommodate, respectively, the index fingers and middle fingers when the hand grasps the grip in certain positions. The upper rear section of the outer side wall extends towards the wedge element to merge with a forward section of the outer side wall. This outer forward section has therein the two biased grooves shaped to accommodate fingers, with an enlarged, rounded mound formed between said two biased grooves in said outer forward side wall which extend into the palm saddle. The most forward groove merges at the lower outside base of the wedge element. When in the "cruise" position, the grooves reduce excess pressure on the base of the first phalanx and lateral ligament of the index finger, the base of the first phalanx and lateral ligament in the middle finger, and all the related tendons and soft tissue. They also prevent extreme slippage when the hand is in the "cruise" position, provide necessary finger support in other hand positions, and relieve heavy pressure on both the ulnar and median nerves in both fingers.

The seventh feature is that the lever arm section has an ergonomical shape. It may be in the form of a sheath which covers the exterior of a conventional lever arm and has on its forward front surface at least three biased grooves shaped and oriented to accommodate, respectively, the index, middle, and ring fingers when the hand grasps the lever. These grooves assist in providing greater power, safety, and leverage during braking from any of the major hand positions, and may also provide a comfortable resting place for the fingers in non-braking situations.

The eighth feature is a frontal knob in the upper front portion of the lever arm section that provides, in conjunction with the wedge element, a site for improved leverage and gripping power. It relieves excess pressure on the median nerve, soft tissue and tendons of the index and middle fingers. When in the "steady climb," "open road," "standard," and "aero" positions it aids in reducing excess pressure on the interphalangeal joints and the base of the distal phalanx of the index and middle fingers and the related lateral ligaments and tendons. In these positions, similar to pulling a trigger of a hand gun, a power grip may be obtained through better utilization of the abductor pollicis and dorsal interosseus muscles in conjunction with the fingers grasping the frontal knob.

The ninth feature is a knuckle pad portion on the backside of the lever arm section which cushions the knuckles when the hand grasps the brake grip. The knuckle pad portion relieves excess pressure on the median nerves in the index and middle fingers when in the "steady climb," "open road," "standard," and "power climb" positions. It also eliminates intense pressure on the base of the distal phalanx, the lateral ligaments and tendons of the index, middle, and ring fingers and the head of the middle phalanx, the lateral ligaments and tendons of the index, middle, and ring fingers when in these same hand positions. It also reduces extreme pressure on the interphalangeal joints of the index, middle, and ring fingers, especially when in the "standard," "open road," "power climb," and "steady climb" positions.

DESCRIPTION OF THE DRAWING

The preferred embodiment of this invention, illustrating all its features, will now be discussed in detail. This embodiment depicts the novel and non-obvious brake grip of this invention shown in the accompanying drawing, which is for illustrative purposes only. This drawing includes the following figures (FIGS.), with like numerals indicating like parts:

FIG. 1 is a perspective view of a left hand brake grip of this invention.

FIG. 2 is a side elevational view looking at the outside of a left hand brake grip shown in FIG. 1.

FIG. 3 is a side elevational view looking at the inside of a left hand brake grip shown in FIG. 1.

FIG. 12 is a perspective view of a pair of the brake grips of this invention mounted on the "drop" bars of a racing type bicycle, showing the bicyclist's hands in the "cruise" position.

FIG. 13 is a perspective view of a pair of the brake grips of this invention mounted on the "drop" bars of a racing type bicycle, showing the bicyclist's hands in the "power climb" position.

FIG. 14 is a perspective view of a pair of the brake grips of this invention mounted on the "drop" bars of a racing type bicycle, showing the bicyclist's hands in the "open road" position.

DESCRIPTION OF THE PREFERRED EMBODIMENT

Figure 4:
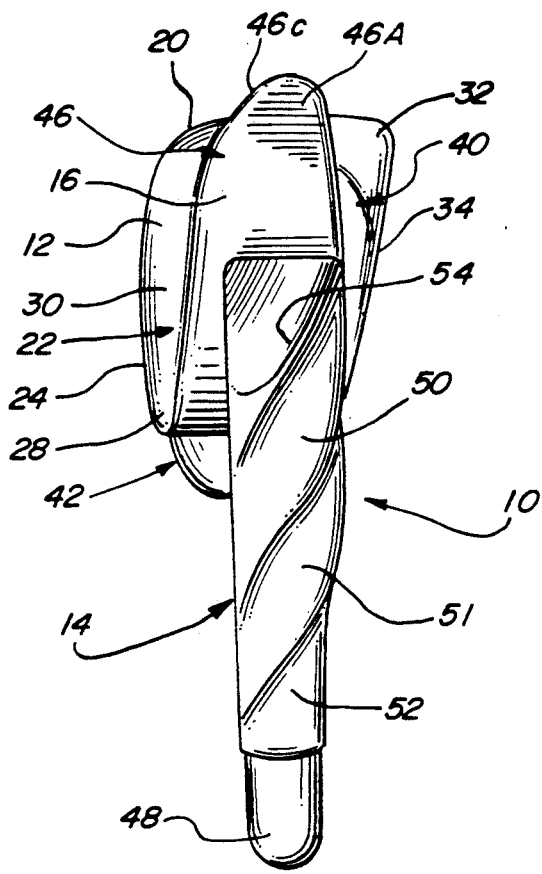
FIG. 4 is a front elevational view of the left hand brake grip shown in FIG. 1.
Figure 5:
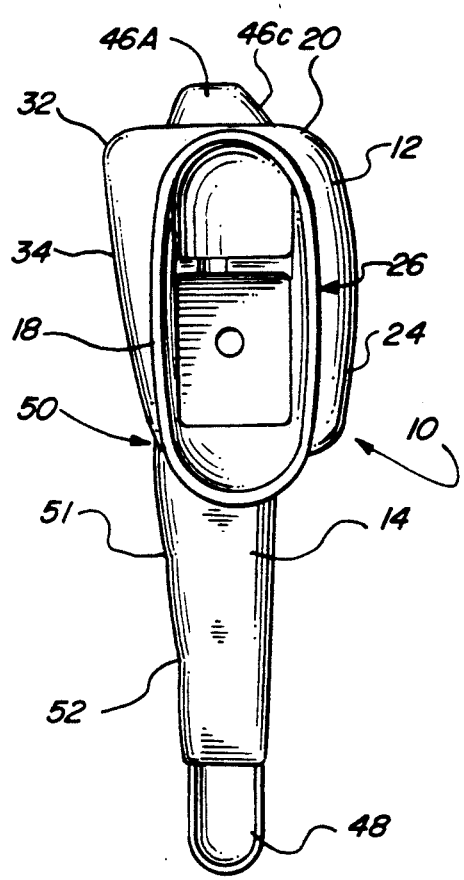
FIG. 5 is a rear elevational view of the left hand brake grip shown in FIG. 1.
Figure 6:
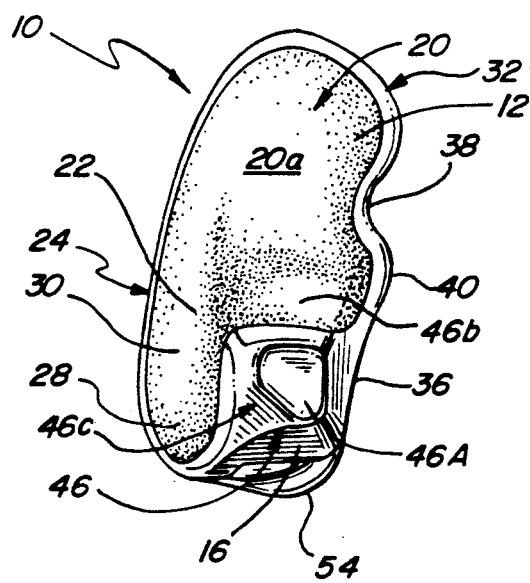
FIG. 6 is a top plan view of the left hand brake grip shown in FIG. 1.
Figure 7:
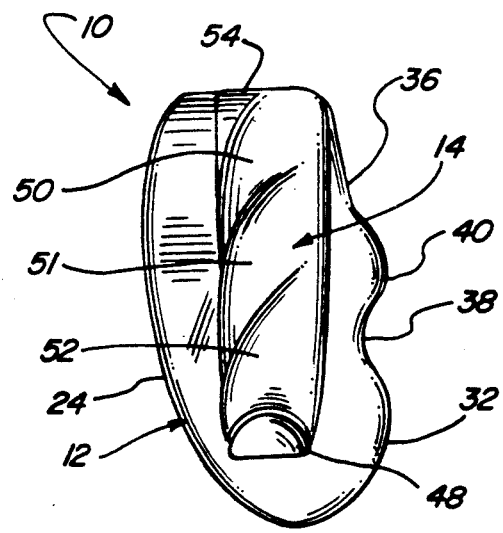
FIG. 7 is a bottom plan view of the left hand brake grip shown in FIG. 1.

As best illustrated in FIGS. 1 through 7, the bicycle brake grip 10 of this invention includes a body member 12 and lever arm section 14, each having a unique ergonomical shape. Both the body member 12 and the lever arm section may be in a form of elastic rubber sheaths which are slipped over, respectively, the body member (not shown) of a conventional brake lever and the attached lever arm 48 of a conventional brake lever. Alternately, a brake grip in accordance with this invention may be constructed of a hard material, with the mechanical components of the brake mounted within the body member and a lever arm attached to the body member in the usual fashion. Both the body member and lever arm would have the ergonomically shaped exterior surfaces as illustrated in FIGS. 1 through 7.

The central feature of the grip 10 is that the body member 12 and lever arm section 14 have the ergonomically shaped exterior surfaces as illustrated. Although the body member 12 and lever arm section have streamlined and attractive appearances, there external surfaces are precisely contoured so that the applied force through the hand is distributed evenly and proportionately in a way that reduces the pressure at sensitive points of the hands, fingers and knuckles.

The body member 12 includes a forward section 16 and rear section 18. The rear section 18 includes a palm saddle 20 which provides an upper, generally horizontal surface on which the palm conveniently rests and is supported in all the major hand positions. The area of the palm saddle 20 is substantially larger than conventional grips and ranges between 3 and 6 square inches. A section 20a of the palm saddle 20 may be replaceable when worn or as desired.

A thumb ledge 22 is provided which has a curved ridge 24, substantially in the shape of a segment of an ellipse, disposed on the inside walls 26 of both the forward and rear sections 16 and 18 of the body member 12. The curved ridge 24 defines the outside border of the thumb ledge 22 and serves as a guide for correctly positioning the thumb on the grip 10. Near the apex of the curved ridge 24, inside the ridge, is a thumb pad 28. The thumb ledge 22 has a smooth, concaved, curved surface 30. This surface 30 expands upwardly and rearwardly from the thumb pad 28 to merge with the inside edge of the palm saddle 20. The area of the surface 30 is between 3 and 6 square inches. Thus the surfaces of the palm saddle 20 and the thumb ledge are contoured to provide a comfortable, supportive fit with the hand and an enlarged surface area to reduce pressure on sensitive nerves, tendons, soft tissue, muscles and bones in the palm of the hand. The replaceable portion 20a corresponds in area substantially to the area of the palm saddle 20 and thumb ledge 22.

The palm saddle 20 has on its outer rear edge a rocker ridge 32. The rocker ridge 32 is formed by an outer wall 34 of the rear section 18 merging with the upper rear edge of the palm saddle 20, generally at a right angle as shown in FIG. 4. Just forward of the rocker ridge 32 in the top of the outer side wall 34 are two biased grooves 36 and 38 which accommodate, respectively, the index and middle fingers in certain positions and other fingers in other positions. The top portions of the grooves 36 and 38 extend into the palm saddle 20, and the lower portions of these grooves extend into the outer side wall 34. Between these grooves 36 and 38 is an enlarged, rounded mound 40. The rear section 18 has a rear wall 42 which is curved to correspond with the curvature of the handle bars 44 (FIGS. 8-14) to which the grip 10 is attached.

Figure 9:
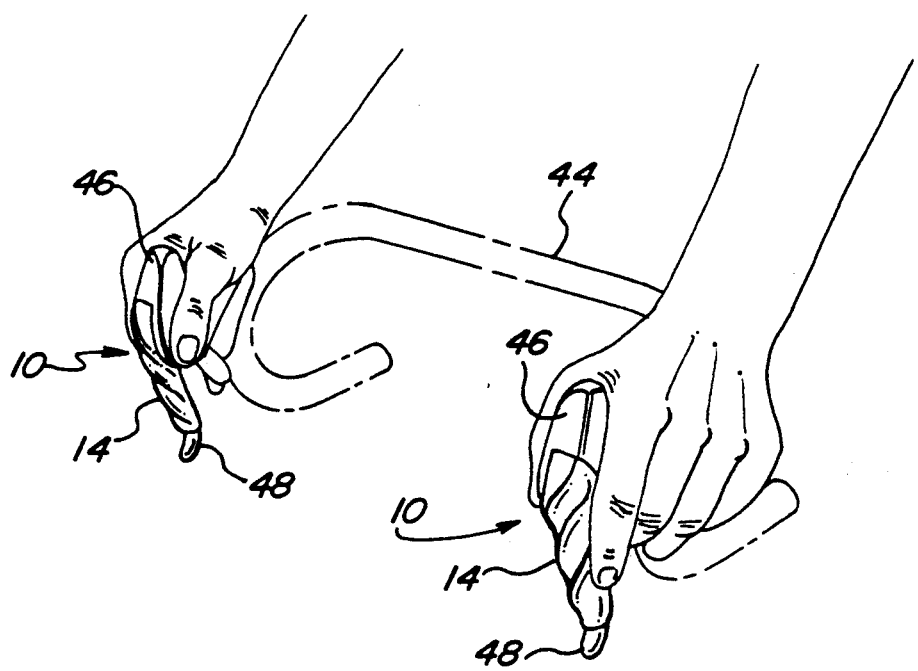
FIG. 9 is a perspective view of a pair of the brake grips of this invention mounted on the "drop" bars of a racing type bicycle, showing the bicyclist's hands in the "power pace" position.

There is in the forward section 16 a wedge element 46 projecting outwardly and upwardly when the bicycle is upright. This wedge element 46 is adjacent the front end of the palm saddle 20. The wedge element 46 has a smooth, curved base 46b which in its lower rear portion merges with front end of the palm saddle, as depicted in FIGS. 2 and 3, and merges at a lower, inner side portion with the curved surface 30 of the thumb ledge 22, and merges at a lower outside portion with the biased groove 36. The abductor pollicis of the hand upon grasping the grip 10, as depicted in FIG. 9, bears against the lower rear portion of the base 46b. The wedge element 46 terminates at an outer end in a semi-rounded tip 46a. Preferably, the semi rounded tip 46a has an inner angular face 46c slopping downward at an angle of approximately 45° from the top of the tip. An underside wall surface 47 of the body member 12 provides a smooth cushioned surface and the backside surface 45 of the lever arm section provides a knuckle pad. The surface 45 is a slightly raised flat smooth pad that cushions the knuckles when the index and middle fingers, or middle and ring depending on which hand position is being used, are wrapped around the underside wall surface 47 and the knuckles are pressed against the inside surface 45 of the lever arm section 14. The thumb is positioned on the thumb ledge 22 with the wedge element 46 bearing against the abductor pollicis and other muscles.

The lever arm section 14 made of a rubber type material stretches and slides over the brake lever 48. Its exterior surface has three biased grooves 50, 51 and 52 which are oriented and spaced apart to accommodate, respectively, the index, middle, and ring fingers when the hand grasps the grip 10 during braking. They may also be used as resting places for the fingers in most positions. The upper front portion of the lever arm section 14 serves as a frontal knob 54 which provides a point for the index, middle, or ring fingers to grasp in certain hand positions.

FIGS. 8 through 14 illustrate the different ways in which a bicyclist may grasp right and left hand grips 10 attached to the handle bars 44.

Figure 8:
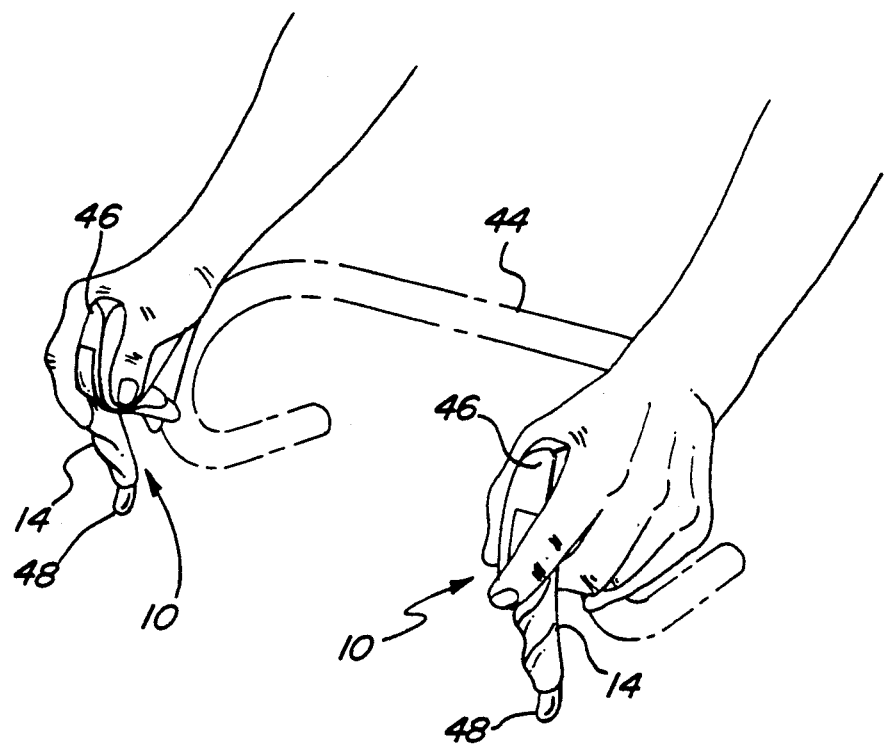
FIG. 8 is a perspective view of a pair of the brake grips of this invention mounted on the "drop" bars of a racing type bicycle, showing the bicyclist's hands in the "standard" position.

FIG. 8 shows the bicyclist's hands in the "standard" position. The weight of the bicyclist is approximately centered and the bicyclist grasps the grip 10 so that the abductor pollicis muscle of the hand bears against the enlarged load-bearing surface 46b of the wedge element 46, the opponens pollicis, abductor pollicis brevis and flexor pollicis brevis muscles rest on the palm saddle 20, the thumb is positioned on the thumb ledge 22, the underside of the tip of the thumb is on the thumb pad 28, and the index finger is wrapped around the frontal knob 54. The middle, ring, and little fingers are wrapped around the surface 47, with the knuckle of the middle finger bearing against the surface 45. The wedge element 46 extends upwardly and outwardly and beyond the abductor pollicis a substantial distance, approximately ¼ inch to one inch for the average adult hand. In this "standard" position the palm saddle 20, wedge element 46, frontal knob 54, the knuckle pad surface 45, smooth cushioned surface 47, thumb ledge 22, thumb pad 28, and rocker ridge 32 are all utilized to distribute evenly and proportionately the heavily applied pressure on the hands, fingers, joints, and knuckles.

FIG. 9 shows the bicyclist's hands in the "power pace" position. Here the upper body weight is shifted slightly forward and the index finger position is moved to along side of the lever arm 48. The positions of the middle, ring and little fingers remains about in the same position as in the "standard" position. The thumb is on the thumb ledge 22, the underside of the tip of the thumb is resting on the thumb pad 28, and the palm area nearest the thumb is resting on the palm saddle 20 and rocker ridge 32. In the "power pace" position, the wedge element 46, the palm saddle 20, the rocker ridge 32, thumb ledge 22, thumb pad 28, are utilized to proportionately distribute the heavily applied pressure on the hands, fingers, joints, and knuckles.

Figure 10:
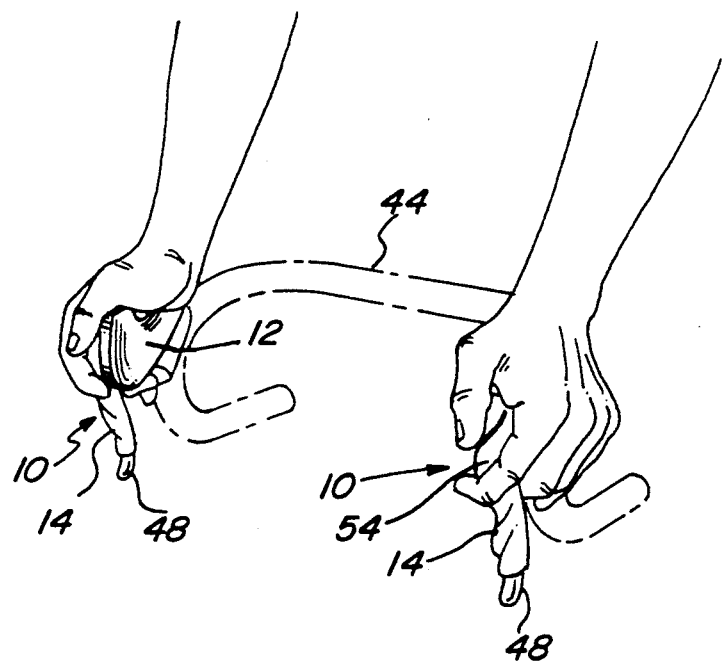
FIG. 10 is a perspective view of a pair of the brake grips of this invention mounted on the "drop" bars of a racing type bicycle, showing the bicyclist's hands in the "steady climb" position.

FIG. 10 shows the bicyclist's hands in the "steady climb" position. Here almost all the upper body weight is shifted forward as the bicyclist stands on the pedals up off the seat. The palm area at the base of the thumb is placed over the rounded tip 46a, thumb gripping the face 46c, and the index finger is placed in the groove 50 grasping the frontal knob 54 firmly. The wrists are turned inwardly as the middle area of the palm rests on the palm saddle 20 and rocker ridge 32. The positions of the middle, ring and little fingers shift slightly, but remain in about the same position as in the "standard" position with the knuckle of the middle finger pressing against the knuckle pad surface 45. In the "steady climb" position the wedge element 46, the palm saddle 20, frontal knob 54, knuckle pad surface 45, and the rocker ridge 32 are utilized to distribute evenly and proportionately the heavily applied pressure on the hands, fingers, joints, and knuckles.

Figure 11:
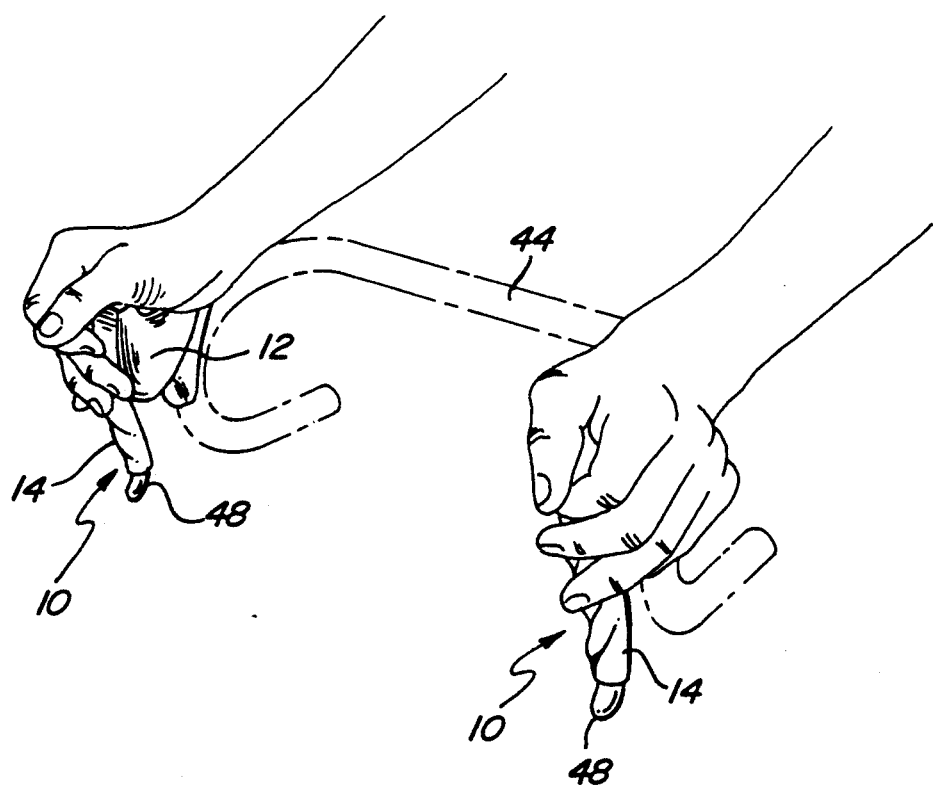
FIG. 11 is a perspective view of a pair of the brake grips of this invention mounted on the "drop" bars of a racing type bicycle, showing the bicyclist's hands in the "aero" position.

FIG. 11 shows the bicyclist's hands in the "aero" position. Here the upper body weight is approximately centered and the head and shoulders lowered, reducing the profile of the bicyclist to minimize air drag. The palm area at the base of the thumb is placed over the semi-rounded tip 46a, thumb gripping the face 46c, and the index finger is wrapped around the front of the wedge element 46. The middle and ring fingers are wrapped around the lever arm 48 and the little finger is positioned on the underside of the lever arm 48, pressing against the knuckle pad surface 45. The middle or ring finger grips the frontal knob 54, with the middle or ring finger being positioned in the groove 50, depending on the hand position. The hypothenar eminence muscles of the palm rest on the palm saddle 20 and rocker ridge 32. In the "aero" position the wedge element 46, the palm saddle 20, rocker ridge 32, frontal knob 54, knuckle pad surface 45, and groove 50 are utilized to distribute evenly and proportionately the heavily applied pressure on the hands, fingers, joints, and knuckles.

FIG. 12 shows the bicyclist's hands in the "cruise" position. Here the upper body weight is slightly forward and the fingers are along the outer wall 34, with the index and middle fingers positioned in the grooves 36 and 38. The thumb is positioned on the thumb ledge 22 with the base of the index finger being supported by the wedge element 46. The top of the palm area just below the base of the first phalanx of the index, middle, and ring fingers rests on the palm saddle 20 and the rocker ridge 32. In the "power pace" position the rocker ridge 32, the palm saddle 20, thumb ledge 22, and the wedge element 46 are utilized to distribute evenly and proportionately the heavily applied pressure on the hands, fingers, joints, and knuckles.

FIG. 13 shows the bicyclist's hands in the "power climb" position. Here almost all the upper body weight is shifted forward as the bicyclist stands on the pedals off the seat. The thumb area of the palm is against the palm saddle 20 with the abductor pollicis muscles snug against the wedge element 46. The index finger is placed in the groove 50 gripping the frontal knob 54, and the middle and ring fingers are wrapped around surface 47 with the top of the middle finger pressing against the knuckle pad surface 45. The upper body weight is shifted from side-to-side over the handle bars 44 as the bicyclist pedals. The bicyclist exerts tremendous weight pressure applied through the hands positioned on the palm saddle 20 and rocker ridge 32, particularly affecting the opponens pollicis, abductor pollicis brevis and flexor pollicis brevis muscles. In the "power climb" position the wedge element 46, frontal knob 54, groove 50, knuckle pad surface 45, smooth surface 47, thumb ledge 22, thumb pad 28, and rocker ridge 32 are utilized to distribute evenly and proportionately the heavily applied pressure on the hands, fingers, joints, and knuckles.

FIG. 14 shows the bicyclist's hands in the "open road" position. Here the weight is approximately centered, the hypothenar eminence muscles of the palm are against the palm saddle 20 and the rocker ridge 32, with the abductor pollicis muscles overlying the semi rounded tip 46a and the thumb gripping the face 46c. The index finger is placed in the groove 50 gripping the frontal knob 54, the middle, ring, and little fingers are wrapped around the surface 47, with the top of the middle finger pressing against the knuckle pad surface 45. In the "open road" position the wedge element 46, knuckle pad surface 45, smooth surface 47, the frontal knob 54, and rocker ridge 32 are utilized to distribute evenly and proportionately the heavily applied pressure on the hands, fingers, joints, and knuckles.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. A bicycle brake grip, comprising
    a body member having a rear section including a curved rear wall that conforms generally to a segment of a bicycle handle bar on which the grip is to be mounted, and a forward section extending outwardly from said handle bar on which the grip is to be mounted,
    in the rear section, an upper surface in the form of a palm saddle oriented substantially horizontal when the bicycle is in a upright position, a rocker ridge along an outer rear edge of the palm saddle, and a thumb ledge on an inner side of the body member which terminates at an outer end in a thumb pad and expands rearwardly from the thumb pad as a curved surface that has a wide rear end which merges with the palm saddle at an inside edge of the saddle,
    in the forward section, an outwardly projecting wedge element terminating at an outer end in a semi-rounded tip, and having a base which merges at a lower, inner side portion with the curved surface of the thumb ledge and at a lower, rear portion with a front end of the palm saddle, said merging portions forming a smooth, rounded, enlarged load bearing surface, and
    a lever arm section having three biased grooves shaped to accommodate respectively index, middle, and ring fingers when the hand grasps a lever.

2. The brake grip of claim 1 where the semi-rounded tip has an inner angular face slopping downward at an angle of approximately 45°.

3. The brake grip of claim 1 where the rocker ridge is formed by an outer rear side wall of the body member merging with the palm saddle to form an approximate right angle, said outer rear side wall having therein two biased grooves shaped to accommodate fingers, with an enlarged, rounded mound formed between said two biased grooves in said outer side wall.

4. The brake grip of claim 1 has an exterior made of a cushioning material.

5. The brake grip of claim 1 wherein the body member and lever arm section are in the form of sheaths that can be stretched to fit over a conventional brake grip.

6. The brake grip of claim 1 wherein a portion of the grip corresponding substantially to the palm saddle is replaceable.

7. A brake grip for a bicycle comprising a body member having an ergonomical shape which supports and distributes the weight and pressure experienced by a hand grasping the grip during bicycling, and including a palm saddle oriented substantially horizontal when the bicycle is in a upright position, a rocker ridge along an outer rear edge of the palm saddle, and a thumb ledge on an inner side of the body member which terminates at an outer end in a thumb pad and expands rearwardly from the thumb pad as a curved surface that has a wide rear end which merges with the palm saddle at an inside edge of the saddle, and an outwardly projecting wedge element terminating at an outer end in a semi-rounded tip, and having a base which merges at a lower, inner side portion with the curved surface of the thumb ledge and at a lower, rear portion with a front end of the palm saddle, said merging portions forming a smooth, rounded, enlarged load bearing surface.

8. The brake grip of claim 7 where the rocker ridge is formed by an outer rear side wall of the body member merging with the palm saddle to form an approximate right angle, said outer side wall having therein two biased grooves shaped to accommodate fingers, with an enlarged, rounded mound formed between said two biased grooves in said outer side wall.

9. The brake grip of claim 7 has an exterior made of a cushioning material.

10. The brake grip of claim 7 in the form of a sheath that can be stretched to fit over a conventional brake grip.

11. The brake grip of claim 7 wherein a portion of the grip corresponding substantially to the palm saddle is replaceable.

12. A brake grip for a bicycle comprising a body member having an ergonomical shape which supports and distributes proportionately the weight and pressure experienced by a hand grasping the grip during bicycling, and including palm saddle oriented substantially horizontal when the bicycle is in a upright position, a rocker ridge along an outer rear edge of the palm saddle, and a thumb ledge on an inner side of the body member which terminates at an outer end in a thumb pad and expands rearwardly from the thumb pad as a curved surface that has a wide rear end which merges with the saddle at an inside edge of the saddle, and an outwardly projecting wedge element terminating at an outer end in a semi-rounded tip, and having a base which merges at a lower, inner side portion with the curved surface of the thumb ledge and at a lower, rear portion with a front end of the saddle, said merging portions forming a smooth, rounded, enlarged load bearing surface, said rocker ridge is formed by an outer rear side wall of the body member merging with the palm saddle to form an approximate right angle, said outer side wall having therein two biased grooves shaped to accommodate fingers, with an enlarged, rounded mound formed between said two biased grooves in said outer side wall.

13. The brake grip of claim 12 having a lever arm section having three biased grooves shaped to accommodate respectively the index, middle, and ring fingers when the hand grasps the lever.

14. The brake grip of claim 13 including a frontal knob in an upper front portion of the lever arm section that provides in conjunction with the wedge element sites for improved leverage, stress reduction, and gripping power.

15. The brake grip of claim 14 including a knuckle pad portion on the underside of an lever arm section and body member which cushions the knuckles when the hand grasps the brake grip.

16. A brake grip for a bicycle comprising a body member having an ergonomical shape which supports and distributes a weight and pressure experienced by a hand grasping the grip during bicycling, said ergonomical shape being formed by a palm saddle oriented substantially horizontal when the bicycle is in an upright position, said palm saddle having a width of at least one and one-quarter inch and an area of at least three square inches, a rocker ridge along an outer rear edge of the palm saddle, a thumb ledge on an inner side of the body member, and an outwardly projecting wedge element having a height of at least three quarter inch and a base which merges at a lower, inner side portion with the thumb ledge and at a lower, rear portion with a front end of the palm saddle, said merging portions forming a smooth, rounded, enlarged load bearing surface.

17. The brake grip of claim 16 where the rocker ridge is formed by an outer rear side wall of the body member merging with the palm saddle to form an approximate right angle, said outer rear side wall extending towards the wedge element to merge with a forward side wall having therein two biased grooves shaped to accommodate fingers, with an enlarged, rounded mound formed between said two biased grooves in said outer forward side wall which extend into the palm saddle.

18. The brake grip of claim 17 including a replaceable portion corresponding in area substantially to the area of the palm saddle and thumb ledge.

* * * * *